DELAY EQUALIZER CIRCUIT USING PARALLEL-T NETWORK

Filed May 15, 1967

INVENTORS.
JEROME E. TOFFLER,
PAUL N. WINTERS,
JOHN N. BUTERBAUGH,
BY
Paul M. Coble
ATTORNEY.

United States Patent Office 3,506,856

Patented Apr. 14, 1970

3,506,856

DELAY EQUALIZER CIRCUIT USING PARALLEL-T NETWORK

Jerome E. Toffler and Paul N. Winters, Anaheim, and John N. Buterbaugh, Manhattan Beach, Calif., assignors to Hughes Aircraft Company, Culver City, Calif., a corporation of Delaware Filed May 15, 1967, Ser. No. 638,380

Int. Cl. H03k *1/16*

U.S. Cl. 307—295 2 Claims

ABSTRACT OF THE DISCLOSURE

The disclosed delay equalizer circuit includes a pair of signal processing channels coupled in parallel, one channel including a voltage dividing network, and the other channel including a parallel-T network connected in a degenerative feedback loop and feeding an inverting buffer amplifier. Output signals from the respective channels are summed and then amplified.

This invention relates to delay equalizer circuits, and more particularly relates to an inductor-free delay equalizer circuit which provides a predetermined frequency sensitive delay with a constant amplitude response throughout its frequency passband. The invention herein described was made in the course of or under a contract or subcontract thereunder (or grant), with the Department of the Army.

In numerous communication and data transmission systems, signal components at different frequencies are subjected to different amounts of delay, thereby distorting signals as they pass through the system. In order to compensate for such delay distortion, delay equalizers have been employed which introduce a frequency sensitive delay complementary to that of the system whose delay is to be compensated so as to provide an overall delay which is substantially constant over the frequency passband of the system. A typical delay equalizer consists of a number of individual delay equalizer circuits coupled in series, each circuit introducing a predetermined delay over a selected frequency band.

Prior art delay equalizer circuits have required relatively large and heavy transformers and/or inductors with iron cores, thereby greatly adding to the size and weight of the circuit.

Accordingly, it is an object of the present invention to provide a delay equalizer circuit which does not require any inductor, thereby minimizing the size and weight of the circuit.

It is a further object of the invention to provide a delay equalizer circuit which is more compatible with microminiaturized circuitry than delay equalizer circuits of the prior art.

In accordance with the foregoing objects, the delay equalizer circuit of the invention includes first and second signal processing channels coupled in parallel and adapted to receive input signals to be delay equalized. The first channel includes a voltage dividing network. The second channel includes a parallel-T network having an input terminal adapted to receive the input signals, an output terminal, and an auxiliary terminal. An amplifier arrangement coupled between the output terminal and the auxiliary terminal provides an output signal from the second channel and applies a feedback signal bearing a predetermined phase relationship with the channel output signal to the auxiliary terminal of the parallel-T network. Signal combining circuitry coupled to the voltage dividing network and to the amplifier arrangement algebraically combines signals from the first and second channels, after which the combined signal is amplified.

Figure 1:
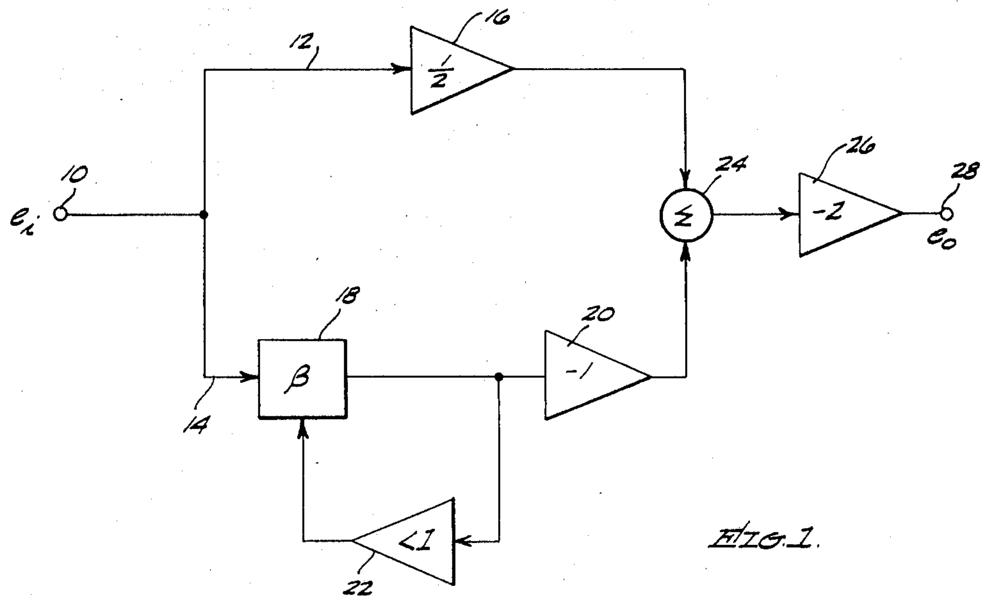
Figure 2:
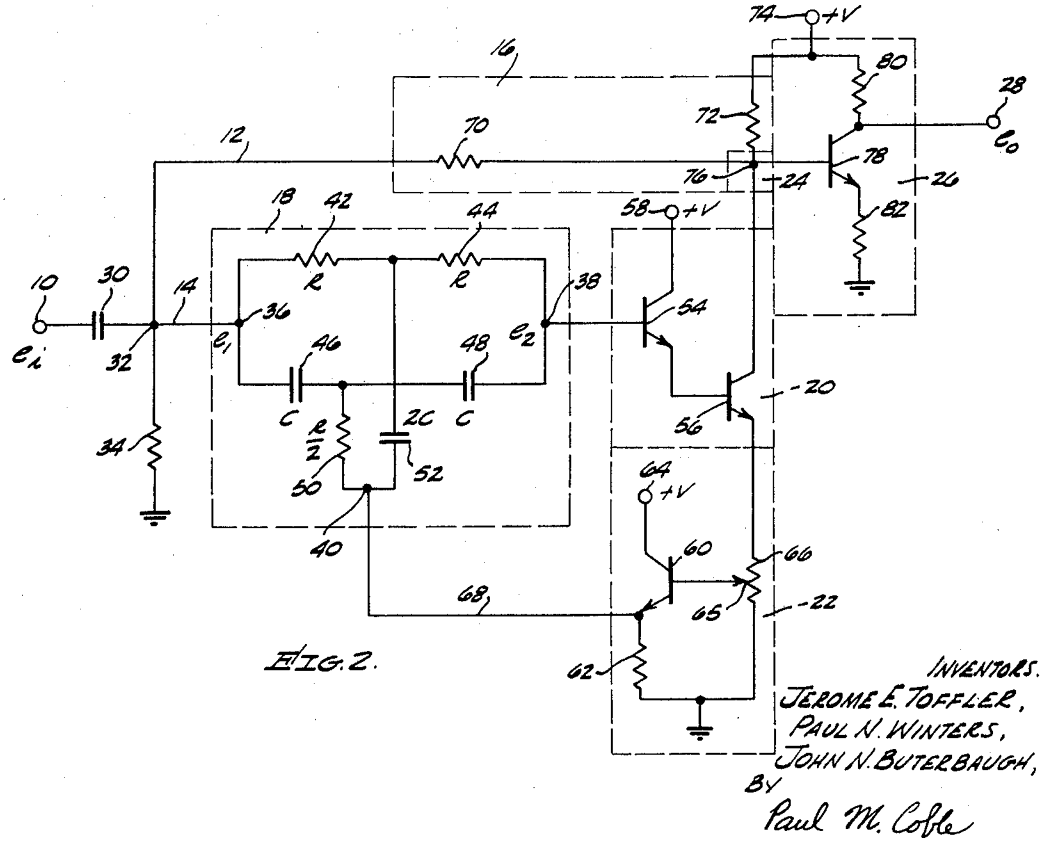

Additional objects, advantages and characteristic features of the present invention will become readily apparent from the following detailed description of a prefered embodiment of the invention when considered in conjunction with the accompanying drawing in which:

FIG. 1 is a block diagram illustrating a delay equalizer circuit in accordance with the invention; and FIG. 2 is a schematic circuit diagram showing a specific delay equalizer circuit which may be constructed in accordance with the block diagram of FIG. 1.

Referring with greater particularity to FIG. 1, a delay equalizer circuit in accordance with the invention may be seen to include an input terminal 10 adapted to receive an input voltage $e_i$, and a pair of signal flow paths, or channels, 12 and 14 fed from the terminal 10. The first channel 12 includes a voltage dividing network 16 which in the illustrative network of FIG. 1 provides voltage division by a factor of two, i.e. a gain of one-half. The second channel 14 includes a parallel-T (alternatively termed a twin-T) network 18 having a voltage transfer function $\beta$ (the ratio of output voltage to input voltage). The term "parallel-T network" is intended herein to mean an electrical network having the circuit configuration illustrated in FIG. 10.1(*c*) of the book Vacuum Tube Amplifiers, MIT Radiation Laboratory Series, vol. 18, Valley and Wallman, McGraw Hill Book Co. Inc., 1948. For further details as to this type of network, reference may be made to pages 384–391 of the aforecited book.

Output signals from the parallel-T network 18 are fed to a buffer amplifier 20 having a high input impedance, and which amplifier in the illustrative network of FIG. 1 has a voltage gain of minus one. Output signals from the parallel-T network 18 are also applied, via a feedback amplifier 22 having a variable voltage gain of less than unity, to an auxiliary terminal of the parallel-T network 18.

Output signals from the respective signal processing channels 12 and 14 are algebraically combined in a summing network 24, the resultant signal being applied to an output amplifier 26 which in the exemplary network of FIG. 1 provides a voltage gain of minus two. The output from the amplifier 26 is connected to a terminal 28 from which output voltage $e_o$ from the delay equalizer circuit of the invention may be obtained.

A specific delay equalizer circuit which may be constructed in accordance with the block diagram of FIG. 1 is shown in FIG. 2. In the circuit of FIG. 2 a coupling capacitor 30 is connected between input terminal 10 and a junction point 32 at the input to the respective signal flow paths 12 and 14, the junction 32 being connected via a resistor 34 to a reference terminal designated as ground.

The parallel-T network 18 may include an input terminal 36 connected directly to the junction point 32, an output terminal 38, and an auxiliary terminal 40. First and second resistors 42 and 44, respectively, each having a resistance value R, are connected in series between the terminals 36 and 38; while first and second capacitors 46 and 48, respectively, each having a capacitance value C, are also connected in series between the terminals 36 and 38. A third resistor 50, having a resistance value $R/2$, is connected between the junction between capacitors 46 and 48 and the auxiliary terminal 40. A third capacitor 52, having a capacitance value 2C, is connected between the junction between resistors 42 and 44 and the terminal 40. The voltage at the terminal 36 as measured with respect to the terminal 40 is designated as $e_1$, while the voltage at the terminal 38 measured with respect to terminal 40 is designated as $e_2$. It is pointed out that while the parallel-T network used in the illustrative preferred embodiment of the present invention is constructed with the aforementioned relative resistance and capacitance values, the present invention is not limited to parallel-T networks employing such values; rather any practical resistance and capacitance values may be employed for the various parallel-T network components.

A typical buffer amplifier 20 which may be employed in a delay equalizer circuit according to the invention is illustrated in FIG. 2 as an inverting amplifier comprising first and second transistors 54 and 56 connected in a Darlington arrangement. The base electrode of the first transistor 54 is connected to the output terminal 38 of the parallel-T network 18, while the collector electrode of the transistor 54 is connected to a power supply terminal 58 supplying a D–C voltage designated +V. The emitter electrode of the transistor 54 is connected to the base electrode of the second transistor 56. The collector electrode of the transistor 56 supplies the output signal from the signal processing channel 14, while the emitter electrode of the transistor 56 furnishes a signal to the feedback amplifier 22.

A typical form of feedback amplifier 22 which may be employed is illustrated in FIG. 2 as comprising a transistor 60 connected in an emitter follower configuration. Specifically, the emitter electrode of transistor 60 is connected to the ground terminal through a resistor 62, while the collector electrode of the transistor 60 is connected to a power supply terminal 64 supplying a D-C voltage designated +V. The base electrode of the transistor 60 is connected to a movable tap 65 of a potentiometer 66 which is connected between the emitter electrode of the transistor 56 and ground. Adjustment of the potentiometer tap 65 controls the gain K of the emitter follower amplifier 22 so that the amplifier gain may be preset to a desired value less than unity. The output signal from the emitter follower amplifier 22 is fed back to the parallel-T network 18 via a lead 68 connected between the emitter electrode of transistor 60 and auxiliary terminal 40 of the parallel-T network.

A typical voltage dividing network 16 which may be employed is illustrated in FIG. 2 as comprising a pair of resistors 70 and 72 connected in series between junction point 32 and a power supply terminal 74 supplying a D-C voltage designated +V. In the preferred embodiment of the invention described herein, it is desired that the voltage divider 16 provide voltage division by a factor of two; hence resistors 70 and 72 are selected to have approximately equal resistance values. The collector electrode of buffer amplifier transistor 56, which furnishes the output signal from the channel 14, is connected to junction point 76 between the voltage dividing resistors 70 and 72 so that the junction 76 functions as the summing junction 24 which algebraically combines the output signals from the respective channels 12 and 14.

The summed output signal from the junction 24 is then amplified in output amplifier 26 which, as shown in FIG. 2, may comprise a transistor 78 having its base electrode connected to the junction 76. The collector electrode of transistor 78 is connected via a resistor 80 to the power supply terminal 74, while a resistor 82 connects the emitter electrode of transistor 78 with ground. The delay equalizer circuit output terminal 28 which provides the output voltage $e_o$ is connected directly to the collector electrode of transistor 78.

In the operation of the delay equalizer circuit of the invention, the parallel-T network 18 provides a signal transmission $\beta$ which introduces frequency sensitive gain and phase shift on the voltage $e_1$ applied to its input terminal 36 so as to provide voltage $e_2$ at its output terminal 38 in accordance with the relation $$\beta=\frac{e_2}{e_1}=\frac{1}{1-j\frac{4}{\left(\frac{f}{f_o}-\frac{f_o}{f}\right)}} \qquad (1)$$

where $f$ is the frequency of the voltage passing through the parallel-T network and $f_o$ is the resonant, or null, frequency of the network as given by $$f_o=\frac{1}{2\pi RC} \qquad (2)$$

This null frequency $f_o$ is approximately the frequency of maximum delay of the delay equalizer circuit.

The signal components traversing the channel 12 are algebraically combined with the signal components traversing the parallel-T network 18 of the channel 14 in such manner as to produce a resultant signal having an amplitude which is independent of frequency and a predetermined frequency sensitive delay. Specifically, the delay equalizer circuit of the invention provides an overall transmission characteristic such that the ratio of the output voltage $e_o$ to the input volage $e_i$ is $$\frac{e_o}{e_i}=\frac{1-jQ_o\left(\frac{f}{f_o}-\frac{f_o}{f}\right)}{1+jQ_o\left(\frac{f}{f_o}-\frac{f_o}{f}\right)} \qquad (3)$$

where $Q_o$ is given by $$Q_o=\frac{1}{4(1-K)} \qquad (4)$$

and where K is the gain of the feedback amplifier 22 as determined by the setting of potentiometer tap 65.

Although the invention has been shown and described with reference to a particular embodiment, nevertheless various changes and modifications obvious to a person skilled in the art to which the invention pertains are deemed to lie within the spirit, scope and contemplation of the invention.

What is claimed is:

1. A delay equalizer circuit comprising: a first terminal, a second terminal, a third terminal, a junction terminal, and a reference terminal; means for applying an input signal between said first terminal and said reference terminal; first and second resistors connected in series between said first and second terminals; first and second capacitors connected in series between said first and second terminals; a third resistor connected between the junction between said first and second capacitors and said third terminal; a third capacitor connected between the junction between said first and second resistors and said third terminal; a first transistor having a base electrode connected to said second terminal, a collector electrode, and an emitter electrode; a second transistor having a base electrode connected to the emitter electrode of said first transistor, a collector electrode connected to said junction terminal, and an emitter electrode; a potentiometer connected between the emitter electrode of said second transistor and said reference terminal, said potentiometer having a movable tap; a third transistor having a base electrode connected to said movable tap, an emitter electrode connected to said third terminal, and a collector electrode; a fourth resistor connected between the emitter electrode of said third transistor and said reference terminal; a fifth resistor connected between said first terminal and said junction terminal; a fourth transistor having a base electrode connected to said junction terminal, an emitter electrode, and a collector electrode; a sixth resistor connected between the emitter electrode of said fourth transistor and said reference terminal; a seventh resistor having one terminal connected to said junction teminal; an eighth resistor having one terminal connected to the collector electrode of said fourth transistor; power supply means connected to the collector electrodes of said first and third transistors and to the other terminals of said seventh and eighth resistors; and means for obtaining an output signal between the collector electrode of said fourth transistor and said reference terminal.

2. A delay equalizer circuit comprising: a first terminal, a second terminal, a third terminal, a junction terminal, nal, and a reference terminal; means for applying an input signal between said first terminal and said reference terminal; first and second resistors connected in series between said first and second terminals; first and second capacitors connected in series between said first and second terminals; a third resistor connected between the junction between said first and second capacitors and said third terminal; a third capacitor connected between the junction between said first and second resistors and said third terminal; a first transistor having a base electrode connected to said second terminal, a collector electrode, and an emitter electrode; a second transistor having a base electrode connected to the emitter electrode of said first transistor, a collector electrode connected to said junction terminal, and an emitter electrode; means for providing a variable resistance between the emitter electrode of said second transistor and said reference terminal; a third transistor having a base electrode coupled to said variable resistance means, an emitter electrode connected to said third terminal, and a collector electrode; a fourth resistor connected between the emitter electrode of said third transistor and said reference terminal; a fifth resistor connected between said first terminal and said junction terminal; a fourth transistor having a base electrode connected to said junction terminal, an emitter electrode, and a collector electrode; a sixth resistor connected between the emitter electrode of said fourth transistor and said reference terminal;

a seventh resistor having one terminal connected to said junction terminal; an eighth resistor having one terminal connected to the collector electrode of said fourth transistor; power supply means connected to the collector electrodes of said first and third transistors and to the other terminals of said seventh and eighth resistors; and means for obtaining an output signal between the collector electrode of said fourth transistor and said reference terminal.

References Cited

UNITED STATES PATENTS

| | | | |
|---|---|---|---|
| 1,759,952 | 5/1930 | McCurdy | 333—75 |
| 2,450,818 | 10/1948 | Vermillion | 328—167 |
| 2,245,365 | 6/1941 | Riddle | 333—75 |
| 2,495,511 | 1/1950 | Dolberg | 330—176 |
| 2,907,838 | 10/1959 | Ross | 333—28 |
| 2,859,414 | 11/1958 | Lundry | 333—75 |
| 3,193,774 | 7/1965 | Clapper | 330—176 |
| 3,336,540 | 8/1967 | Kwartiroff et al. | 333—28 |
| 3,411,098 | 11/1968 | Perra | 333—75 |

JOHN S. HEYMAN, Primary Examiner

H. A. DIXON, Assistant Examiner

U.S. Cl. X.R.

307—229; 328—163; 333—28, 75